United States Patent [19]

Farmer

[11] 4,269,443
[45] May 26, 1981

[54] MOTOR VEHICLE WITH CONVERTIBLE BODIES

[76] Inventor: Gary W. Farmer, P.O. Box 4907, Boise, Id. 83704

[21] Appl. No.: 209

[22] Filed: Jan. 2, 1979

[51] Int. Cl.³ .............................................. B62D 35/00
[52] U.S. Cl. ..................................... 296/1 S; 105/418; 105/422; 296/35.3; 296/36
[58] Field of Search .................. 296/35 R, 35 A, 1 S, 296/35.1, 36, 35.3; 52/476, 730; 105/401, 409, 422, 418

[56] References Cited

U.S. PATENT DOCUMENTS

| | | | |
|---|---|---|---|
| 1,552,702 | 9/1925 | Irish | 296/35.1 |
| 2,036,555 | 4/1936 | Thompson et al. | 105/401 |
| 2,151,640 | 3/1939 | Menning | 296/35 A |
| 2,288,548 | 6/1942 | Peremi et al. | 52/476 X |
| 2,324,508 | 7/1943 | Johnson | 296/36 |
| 2,815,722 | 12/1957 | Dean | 105/401 |
| 3,131,649 | 5/1964 | Eggert, Jr. | 105/401 |
| 3,266,837 | 8/1966 | Stricker, Jr. et al. | 296/36 X |
| 3,439,821 | 4/1969 | Hand | 296/35 A X |
| 3,621,236 | 11/1971 | Hlinsky | 296/35 A |
| 3,930,680 | 1/1976 | Littlefield | 296/36 X |
| 4,098,534 | 7/1978 | Wood | 296/1 S |

Primary Examiner—John J. Love
Assistant Examiner—Michael Mar
Attorney, Agent, or Firm—Paul F. Horton

[57] ABSTRACT

A flat bed truck wherein the bed includes a raised sill having a plurality of threaded apertures about the periphery and a cargo-personnel carrier having a peripheral shoulder mateable with the sill and held to the bed by quick-release bolts. The carrier preferably includes a forward wall having a forwardly protruding ellipsoidal shape to lower wind resistance and therefore stress on the bolts. The sill of the bed is also provided with a plurality of rectangular apertures adapted to receive stake members of a conventional livestock stake rack. The shoulder of the carrier may be provided with an interior vertically depending flange adapted to abut the interior vertical ledge of the bed sill to prevent lateral movement and to protect cargo from moisture.

4 Claims, 6 Drawing Figures

MOTOR VEHICLE WITH CONVERTIBLE BODIES

BACKGROUND OF THE INVENTION

1. Field of the Invention

This invention relates to convertible truck boxes in general, and to convertible boxes attachable to flat bed trucks, in particular.

2. Description of the Prior Art

The desirability of changing truck boxes has long been recognized. In this manner, boxes for many different uses, such as bulk food hauling, finished goods hauling, livestock transportation, and campers etc., may be attached to a common truck chassis. A number of systems for converting boxes for different purposes are well known in the art. One vehicle, as typified by U.S. Pat. No. 3,520,433 H. D. Blackburn, utilizes means for locking a box, complete with bed, to a truck chassis. U.S. Pat. No. 3,955,845 to Willy T. Werner describes a box which is easily disassembled for storage and reassembled for delivery purposes. Perhaps the most common system used, as typified by U.S. Pat. No. 3,119,503 to W. A. Herpich et al, has guides with latch pins for attaching a body to a flat bed. Such systems generally have the disadvantages of requiring separate beds for each box, requiring time consuming assembly and disassembly, and, where boxes are attached to existing beds, the boxes are not tightly secured to the bed, resulting in undesirable creaks and rattling and further resulting in moisture damage to the cargo. Furthermore the boxes are not aerodynamically designed to prevent potentially dangerous stress to the latch members holding the box to the bed.

SUMMARY OF THE INVENTION

The present invention comprises a cargo vehicle having a substantially flat bed secured to the chassis of the vehicle; the bed including a raised peripheral sill with a plurality of threaded apertures; a cargo container having a shoulder adapted to mate with the sill; and a plurality of bolts receivable in the threaded apertures to secure the cargo container to the bed. A more definite description of the invention may be found in the appended claims.

It is therefore a general object of the present invention to provide a cargo vehicle having a bed to which may be easily mounted a variety of boxes for varying uses.

More specifically, it is an object of the present invention to provide a truck having an attached flat bed to which may be readily mounted a variety of boxes by means of quick-release bolts about the periphery of the bed.

It is a further object of the present invention to provide a flat bed truck having a cargo container attachable by bolts about the periphery of the bed and wherein the container is aerodynamically designed to reduce stress upon the latch bolts.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
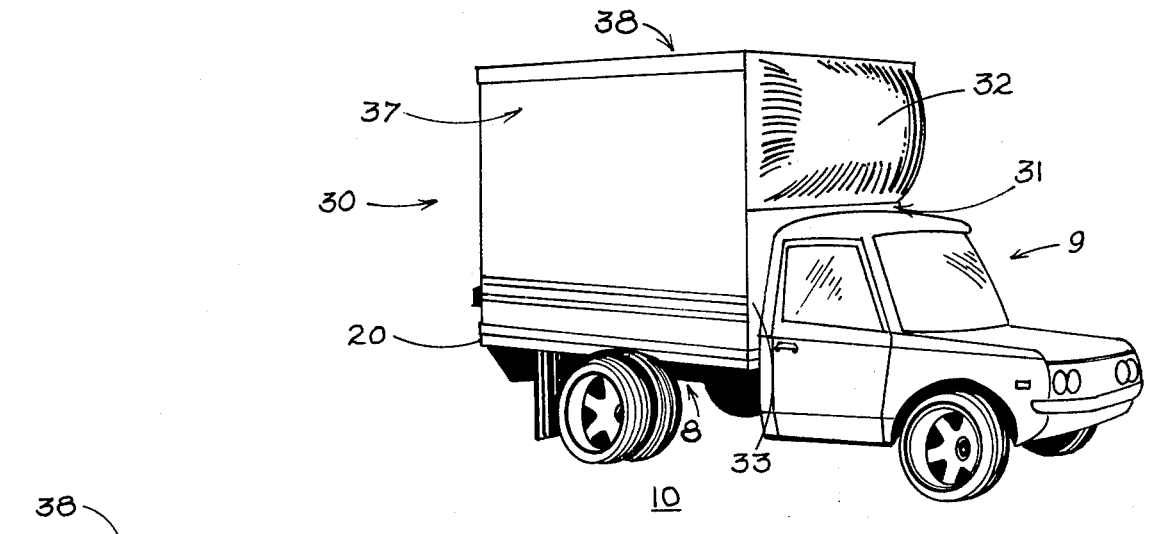
FIG. 1 is a perspective view of a truck, showing one embodiment of a cargo container of the present invention.

Referring now to the drawings, an embodiment to be preferred of a vehicle 10, made according to the present invention, is disclosed. Vehicle 10 includes, generally, a cab portion 9, chassis 8, bed 20, and cargo container 30.

Figure 2:
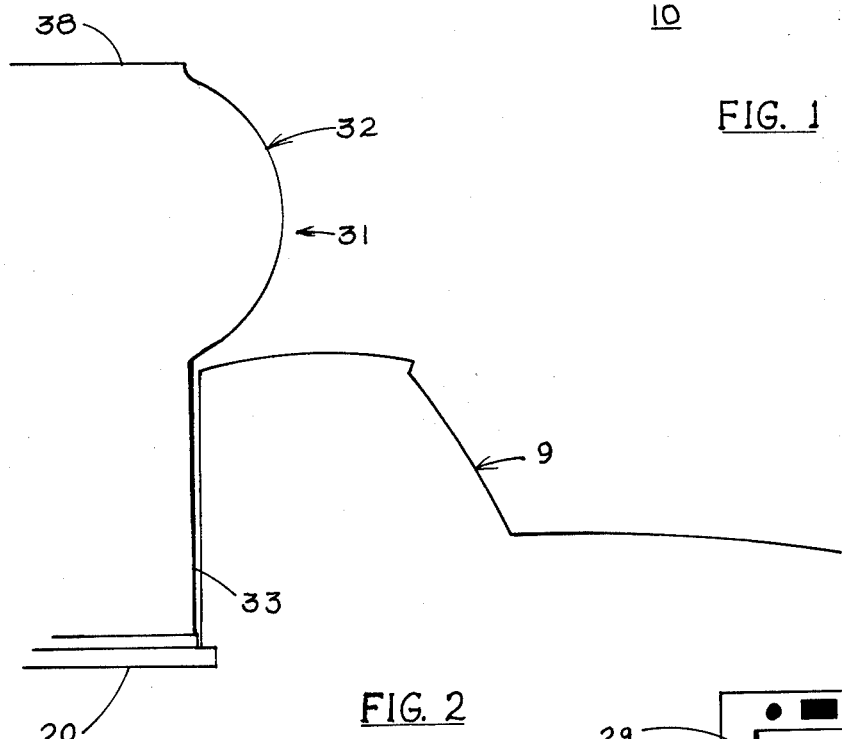
FIG. 2 is a partial side elevation of the cargo container of FIG. 1.

Cargo container 30 may take many forms. It is contemplated that a great many containers 30 of varying sizes and shapes may be interchangeably attached to bed 20 for a variety of purposes. The term "cargo" as used in these specifications and in the appended claims refers not only to conventional merchandise but also to personnel carriers, as for example, campers. It is preferred that container 30 include a front wall 31 having an upper segment beginning at substantially the vertical midpoint of wall 31 which is substantially ellipsoidally protruding, as shown to advantage in FIGS. 1 and 2. Ellipsoidal upper portion 32 is aerodynamically designed to reduce drag on container 30 and therefore to reduce stress on the bolts securing container 30 to bed 20. Lower segment 33 of front wall 31 is planar or, in the alternative, may conform to the back of cab 9. The van, as shown in FIG. 1, also includes conventional planar side portions 37, which may or may not contain windows, and a planar top 38 connecting side portions 37 and front portion 31. The rear of the container may be either open or may include conventional closure members. Container 30 includes a shoulder 60 about its lowermost terminal end for mating with sill 25 of bed 20, as will hereinafter be more fully explained.

Figure 3:
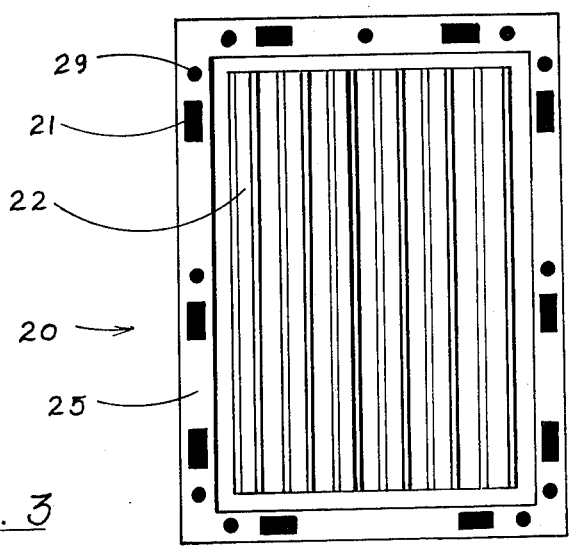
FIG. 3 is a plan view of the bed of a preferred embodiment of the present invention.
Figure 4:
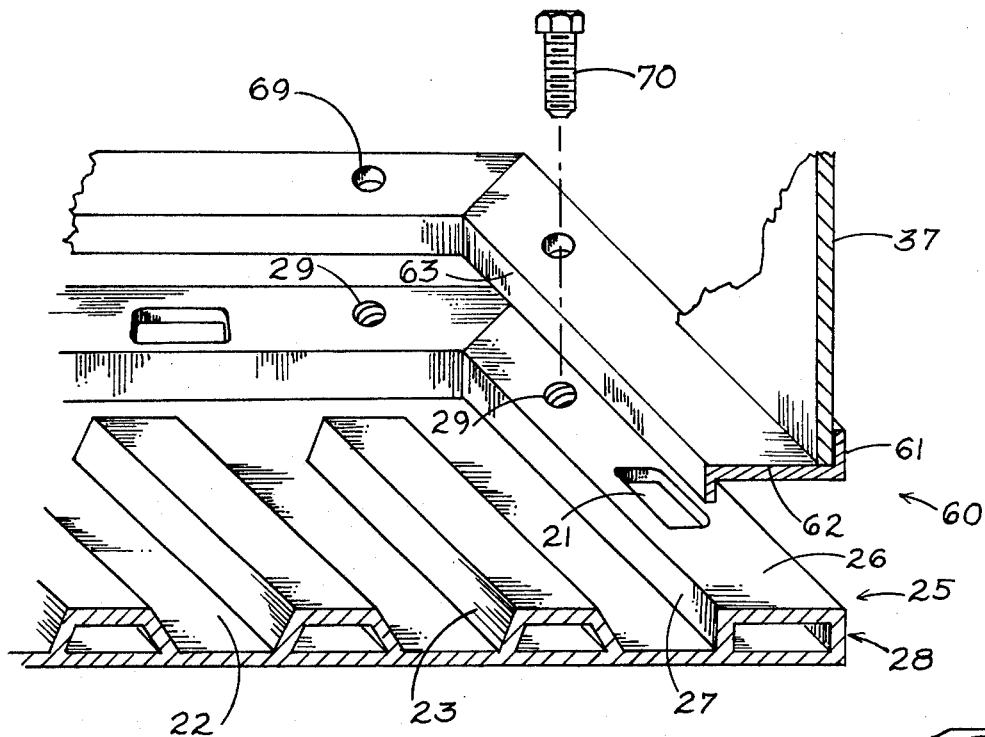
FIG. 4 is a perspective exploded view showing the mating structure of the box and bed.
Figure 5:
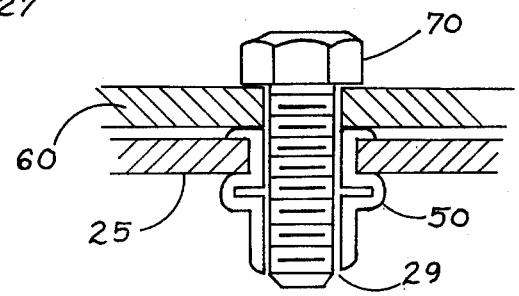
FIG. 5 is a sectional view showing attachment of the container shoulder to the bed sill.

Bed 20, seen to advantage in FIGS. 3 and 4, except for sill 25, is conventional in nature and attaches by conventional means to chassis 8 of truck 10. Floor 22 may be flat or, as preferred, may include a multiplicity of longitudinally extending grooves 23, as is conventional in the art. The term "flat bed" as used herein refers to conventional beds. Sill 25 of bed 20 comprises a metal channel member extending about the periphery of the bed and raised from the adjacent floor. The sill includes a substantially planar top surface 26 and a pair of vertical side walls, inner wall 27 and outer wall 28. Sill 25 is provided with a plurality of vertically extending threaded apertures 29, horizontally spaced and in alignment with one another at the approximate lateral mid-point of the sill. Apertures 29 may be threaded directly into top surface 26 of the sill or, as is preferable, may take the form of a threaded insert 50, as shown in FIG. 5. The number of apertures 29 may vary, depending upon the size of the box. There are at least two apertures and preferably three on the front and side sills and preferably two on the back sill. The sill may also be provided with a plurality of large rectangular apertures 21, into which are inserted conventional stakes of stake racks when livestock is to be carried.

Referring now to FIGS. 4 and 5, means of attaching cargo container 30 to bed 20 is shown to advantage. Shoulder 60 is substantially Z-shaped in cross section, including an outer vertically extending flange 61 attached to side wall 37 of container 30; a substantially planar, horizontally extending mid-section 62; and a downwardly depending inner flange 63. Mid-section 62 includes a plurality of horizontally spaced, vertically extending apertures 69 which are brought into alignment with apertures 29 of sill 25 when shoulder 60 of container 30 and sill 25 of bed 20 are in a mating position. Container 30 is secured to bed 20 by means of bolts 70 which extend through apertures 69 and are threaded into apertures 29. It will be noted that once the sill and shoulder are in mating position, inner flange 63 of shoulder 60 loosely abuts vertical wall 27 of sill 25, thereby directing any moisture that might enter between the sill and shoulder to groove 23 to prevent any contact between the moisture and the cargo placed upon the bed.

Figure 6:
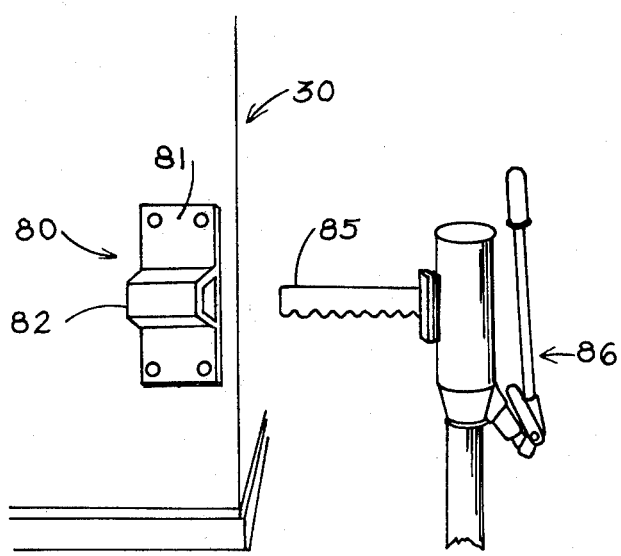
FIG. 6 is a perspective view of one corner of the cargo container showing the jack attachment brackets.

Referring to FIG. 6, jack brackets 80, as used in the present invention, are shown. Brackets 80 include a flat attachment portion 81, having apertures for receiving bolts or screws to secure the brackets to container 30. Brackets 80 are provided with a U-shaped enclosure member 82 defining a rectangular horizontally extending channel which is operable to receive a horizontally extending arm 85 of a conventional jack 86.

In operation, vehicle 10 is backed under a container 30 which is supported by four jacks adjacent each corner of the container. When sill 25 of bed 20 of the truck is in alignment with shoulder 60 of container 30, the truck is stopped and the cargo container is lowered upon the bed by operation of the jacks. When in place, the jacks are removed by horizontally pulling arms 85 of jacks 86 from the channel of brackets 80. Next, the operator enters the back of cargo container 30 and threads bolts 70 through apertures 69 of shoulder 60 into threaded apertures 29 of sill 25 of bed 20. Lateral movement of container 30 on bed 20 is prevented by inner flange 63 as it abuts vertical edge 27 of sill 25. Vertical movement is prevented by engagement of the undersuface of the head of bolt 70 against the top surface of shoulder 60. For removal of the container, bolts 70 are removed and the procedure reversed. When one desires to carry livestock, conventional racks, not shown, are installed on each side of the bed by placement of stakes into apertures 21.

Having thus described in detail a preferred embodiment of the present invention, it is to be appreciated and will be apparent to those skilled in the art that many physical changes and improvements can be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. In combination with a cargo vehicle:
   a substantially rectangular flat bed adapted to securely engage the chassis of the vehicle, said bed including a raised peripheral sill having a plurality of horizontally spaced, vertically disposed, threaded apertures;
   a rigid cargo container unit having vertical walls engaging a horizontally extending peripheral shoulder adapted to mate with the sill, the shoulder including a plurality of horizontally spaced, vertically disposed, apertures adapted to vertically align with the apertures of the sill of said bed when the container shoulder and bed sill are in mating position; and
   a plurality of threaded bolts receivable in the threaded apertures of said sill and operable to secure said cargo container to said bed, wherein the sill of said bed includes a substantially planar top surface and a substantially vertical interior edge and wherein the shoulder of said cargo container contains a substantially planar bottom surface and a downwardly depending interior flange operable to abut the vertical edge of the sill and an oppositely disposed, upwardly extending exterior flange operable to abut the exterior surface walls of said cargo container.

2. The apparatus as described in claim 1, wherein said cargo container includes a box having a pair of vertically extending, substantially planar side portions, a planar top portion connecting the side portions, and a front portion connecting top and side portions, the front portion having a substantially planar lower segment and a substantially ellipsoidal forwardly protruding upper segment.

3. The apparatus as described in claim 2, further comprising at least four jack brackets, each jack bracket located adjacent a separate corner of said cargo container and each bracket defining a horizontal channel operable to receive a horizontally extending arm of a jack.

4. The apparatus as described in claim 1, wherein the sill of said bed includes a plurality of horizontally spaced, vertically disposed, substantially rectangular apertures adapted to receive vertically extending stakes of a stake rack body.

* * * * *